United States Patent [19]

Schirmann et al.

[11] Patent Number: 4,724,133

[45] Date of Patent: Feb. 9, 1988

[54] PREPARATION OF CONCENTRATED AQUEOUS SOLUTION OF HYDRAZINE HYDRATE

[75] Inventors: Jean P. Schirmann, Oullins; Jean Combroux, Mornant; Serge Y. Delavarenne, Francheville Le Haut, all of France

[73] Assignee: Atochem, Paris, France

[21] Appl. No.: 759,282

[22] Filed: Jul. 26, 1985

Related U.S. Application Data

[63] Continuation of Ser. No. 375,233, May 5, 1982, abandoned, which is a continuation of Ser. No. 290,027, Aug. 5, 1981, abandoned, which is a continuation-in-part of Ser. No. 182,369, Aug. 29, 1980, abandoned, which is a continuation of Ser. No. 721,245, Sep. 8, 1976, abandoned.

[30] Foreign Application Priority Data

Sep. 10, 1975 [FR] France ............................... 75 27698

[51] Int. Cl.$^4$ ............................................. C01B 21/16
[52] U.S. Cl. ..................................... 423/407; 568/383
[58] Field of Search ...................... 568/383; 423/407

[56] References Cited

U.S. PATENT DOCUMENTS

| 3,607,041 | 9/1971 | Ellis et al. | 423/407 |
| 3,869,541 | 3/1975 | Weiss | 423/407 |

FOREIGN PATENT DOCUMENTS

| 626885 | 9/1961 | Canada | 423/407 |
| 952282 | 3/1964 | United Kingdom | 423/407 |
| 1164460 | 9/1969 | United Kingdom | 423/407 |

*Primary Examiner*—John Doll
*Assistant Examiner*—Wayne A. Langel
*Attorney, Agent, or Firm*—Burns, Doane, Swecker & Mathis

[57] ABSTRACT

A continuous method for the preparation of concentrated aqueous solutions of hydrazine hydrate from concentrated aqueous solutions of acetone azine by a hydrolysis reaction and distillation under pressure in a column. The concentration of the aqueous solution of acetone azine is such that the water/azine molar ratio ranges between 3 and 7.

14 Claims, No Drawings

PREPARATION OF CONCENTRATED AQUEOUS SOLUTION OF HYDRAZINE HYDRATE

This application is a continuation of application Ser. No. 375,233, filed May 5, 1982, which is a continuation of Ser. No. 290,027, filed Aug. 5, 1981, which is a continuation-in-part of Ser. No. 182,369, filed Aug. 29, 1980, which is a continuation of Ser. No. 721,245, filed Sept. 8, 1976, all now abandoned.

The present invention relates to an improved method for obtaining concentrated aqueous solutions of hydrazine hydrate by the quantitative hydrolysis of concentrated aqueous solutions of acetone azine, i.e. a ketazine.

Aqueous solutions of acetone azine may be obtained by various methods. One method comprises the addition of acetone to very dilute aqueous solutions of hydrazine hydrate obtained, for example, in the Raschig synthesis. However, yields of hydrazine hydrate in this synthesis scarcely exceed 60% and the solutions obtained contain only 1 to 2% by weight of hydrazine hydrate and about 4% of sodium chloride. Another method comprises oxidation of ammonia by sodium hypochlorite or a peroxycompound derived from hydrogen peroxide in the presence of acetone followed by separation of the azine from the reaction medium by distillation. Both of the above processes are taught as prior art in, for example, U.S. Pat. No. 4,189,411 to Kohnen et al.

In an article by E. C. Gilbert, *Journal of the American Chemical Society*, Vol. 51, pages 3394–3409 (1929), the author presents the results of studies of the equilibrium of formation and hydrolysis of azines in aqueous solution and has calculated the thermodynamic parameters of the system. The hydrolysis reaction is endothermic and, thus, Le Chatelier's principle indicates that said reaction is favored by an elevation of temperature. Dr. Gilbert verifies this on page 3408 where he states "A rise in temperature will therefore shift the whole equilibrium markedly to the right favoring the hydrolysis." Under these conditions, and taking into account the boiling points of lower ketones (such as acetone, methylethylketone, etc.) it is apparent to the art that in order to increase the temperature so as to favor hydrolysis, it is necessary to operate under pressure. Thus, obtaining hydrazine hydrate from a ketazine requires a hydrolysis which in general is carried out at high temperature and thus under pressure.

The balanced reaction of hydrolysis of azines by $H_2O$ at elevated temperature and under pressure is therefore in the public domain since 1929. This is a well known technique shown by the following equation:

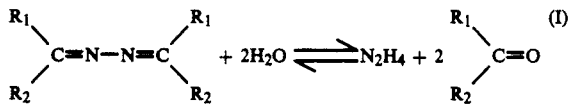

$$\underset{R_2}{\overset{R_1}{\diagdown}}C=N-N=C\underset{R_2}{\overset{R_1}{\diagup}} + 2H_2O \rightleftharpoons N_2H_4 + 2 \underset{R_2}{\overset{R_1}{\diagdown}}C=O \quad (I)$$

From the kinetic and thermodynamic study of this equilibrium made in the Gilbert article, it is brought out clearly (pages 3404 and 3408) that a raising of the temperature favors movement of this equilibrium to the right and therefore favors hydrolysis. It is known to the art that one means for moving an equilibrium consists in eliminating from the medium one of the participants of the equilibrium, for example, ketone. It is also known to the art that it is possible to shift the equilibrium by increasing the concentration of one of the reagents, for example, water. Thus, the simultaneous use of these three means is known to the art.

Thus, by acid hydrolysis of the ketazine, i.e. acetone azine of the present invention, a hydrazine salt may be obtained by a known method with liberation of acetone. Then this salt may be treated according to known methods in order to arrive at the hydrazine hydrate. This indirect and expensive process is advantageously avoided in modern methods of synthesis of hydrazine, which include a direct hydrolysis in a distillation column operating under pressure and at high temperature.

In French Pat. No. 1,315,348 which corresponds to British Pat. No. 952,282 and U.S. Pat. No. 3,189,411 to Kohnen et al., and in French Pat. No. 1,506,943 which corresponds to British Pat. No. 1,174,050, there are described methods for the hydrolysis of aqueous solutions of azines and/or corresponding hydrazones, which consist of distilling these azine solutions continuously in a column at a pressure of 1 to 50 bars, at a temperature ranging from 100° C. to 250° C. at the base of the column. At the head of the column, the liberated ketone is distilled off, whereas at the base an aqueous solution of hydrazine hydrate is collected. However, in these prior known methods, the concentration of the aqueous solution of hydrazine hydrate that is obtained is relatively low, generally less than 15% and more often of the order of 10%. The afore-mentioned French Pat. No. 1,315,348 and its British and U.S. patent equivalents present the first experimental description known to the present inventors of hydrolysis of a ketazine at high temperature and, hence, under pressure.

In U.S. Pat. No. 3,481,701 to Otsuka et al. the patentees call attention to the fact that it is a well known principle that hydrazine hydrate can be made from ketazines under 5–10 atmospheres pressure by means of hydrolysis and that it requires a temperature of 130°–180° C. The patentees assert, however, that said known process had the following three defects:

1. The high temperature causes the hydrazine hydrate to decompose.
2. It requires a high pressure generating apparatus.
3. As the hydrolysis of ketazine evolves a great volume of vapor, the thermal efficiency is impaired.

According to the prior state of the art, the aqueous solution of azine which is to be subjected to hydrolysis is obtained in the form of its azine-water azeotrope, which consists of a highly concentrated solution, yet it is diluted by means of a considerable proportion of water before being subjected to the hydrolysis step. The content of hydrazine hydrate in the acetoneazine and/or hydrazone solutions used ranges between 5% and 15% by weight, and the hydrolysis step necessitates the use of large amounts of energy, equivalent to at least 10 tons of steam per ton of hydrazine hydrate involved.

All of the examples disclosed in prior art known to the present inventors in the area of hydrolysis under pressure use a water-azine molar ratio greater than 8.3, and in the vicinity of 20 as a general rule. On the other hand, Canadian Pat. No. 626,885 which corresponds to U.S. Pat. No. 3,028,219 to Rahlfs, is not in the field of hydrolysis under pressure. Furthermore, this patent is not directed to the production of hydrazine hydrate but rather to the removal of acetone from aqueous hydrazine solutions containing the same. Only a part of the acetone is separated and both the sump discharge and distillate contain greater amounts of acetone than hydrazine hydrate. Thus, considering all of the prior art teachings, there was no reason for one skilled in the art to attempt to use lower molar ratios in hydrolysis under pressure.

Moreover, in all of the prior art known to the present inventors in the area of hydrolysis under pressure, the concentration of hydrazine hydrate resulting from the hydrolysis of a ketazine is of low concentration, never exceeds 20%, and is generally less than 15% by weight. Where quantitative hydrolyses are concerned, it is about 10%. However, the strengths of industrial, commercial solutions are most frequently 24%, 35%, 80% and even 100% hydrazine hydrate. Thus, there has been a continued effort in the art to develop an advantageous process for obtaining concentrated solutions of hydrazine hydrate directly.

The present invention provides a method whereby disadvantages of prior known methods may be overcome and whereby the above object has been accomplished.

The new method which is described by the present invention unexpectedly permits a substantially quantitative rate of hydrolysis to be achieved. This result is accomplished using a proportion of water substantially lower than that which is used according to the heretofore known state of the art. The present invention provides a method for obtaining a stable solution of hydrazine hydrate which is substantially more concentrated than are solutions produced by prior known methods. Having a concentration equal to at least 30% by weight and in general exceeding 45% by weight the products of the invention are directly usable for practical purposes known to the art. Very little, if any, secondary or by-products are formed as a result of the method of the invention with substantially quantitative yields of the desired hydrazine product being obtained. The process also has the advantage of particularly low specific energy consumption.

Described in further detail, the present invention relates to a continuous method for the preparation of concentrated aqueous solutions of hydrazine hydrate from concentrated aqueous solutions of acetone azine. The method is carried out by hydrolysis and distillation under pressure using a distillation column which permits fractionation and the withdrawal of acetone at the head and hydrazine at the base or bottom of the column. The column is fed with an aqueous solution of acetone azine the concentration of which varies and may be expressed as a water/azine molar ratio ranging between 3 and 7; that is to say at least equal to 3 and not exceeding 7.

In accordance with the method of the present invention, a temperature is maintained at the base or bottom of the column ranging between 150° C. and 200° C., preferably between 175° C. and 200° C. Pressure is maintained in the column so that the boiling point of the solution will lie between the range of temperatures defined above. This pressure generally ranges between 2 and 20 bars and preferably between 8 and 12 bars.

Various types of fractionating columns may be used to carry out the method of the present invention. For example, a plate column or packed column of simple construction may be used. Generally these columns will have a constant diameter and number of theoretical plates per unit height of column. The column is fed preferably at its middle portion.

Operation of the distillation column is effected with a low reflux ratio generally ranging between 0.25 and 5 and more particularly between 0.5 and 2. This aspect of the invention, added to the minimal amounts of water used, represents an important advantage from the energy point of view.

In a particularly advantageous and economical embodiment of the invention, a plate or normally packed distillation column is fed with an acetone azine solution corresponding to an azeotropic mixture (water/azine molar ratio about 6), at a pressure of from 8 to 12 bars while maintaining a temperature ranging between 180° C. and 200° C. at the base of the column. At the head of the column, the acetone which is liberated is distilled off with a substantially quantitative recovery. At the base or bottom an aqueous solution is continuously withdrawn wherein the concentration strength of the hydrazine hydrate is approximately 50%.

The following example illustrates the method of the present invention. Unless otherwise indicated the parts and percentages are expressed by weight.

EXAMPLE 1

Into a distillation column having a height of 1.8 m and diameter of 20 mm packed with Raschig rings, 21.7 g/h of an aqueous solution of acetone azine containing 21% of hydrazine hydrate and 48.7% of acetone are fed continuously. The column operates at a pressure of 8 bars and with a reflux ratio of 1. The temperatures at the head and at the base of the columns are 130° C. and 178°–179° C., respectively.

The rates of production are as follows:

25 g/h of acetone and 22.1 g/h of an aqueous solution of hydrazine hydrate containing 10.5 g of hydrazine hydrate and 11.5 g of water which corresponds to a hydrazine hydrate concentration of 47.7% are removed from the top and base of the column respectively.

What is claimed is:

1. A continuous process for the preparation of an at least 30% concentrated aqueous solution of hydrazine hydrate, comprising (i) continuously, substantially quantitatively hydrolyzing a concentrated aqueous solution of acetone azine, the molar ratio of the amount of water which comprises said aqueous solution to said acetone azine dissolved therein ranging from 3 to 7, (ii) continuously, concomitantly distilling from said reaction medium a distillate fraction which consists essentially of acetone liberated from said acetone azine and a minor amount of water, said steps (i) and (ii) being carried out at elevated temperature and under superatmospheric pressure, and (iii) continuously withdrawing from said aqueous hydrolysis medium a base fraction consisting essentially of a stable, at least 30% concentrated solution of essentially pure hydrazine hydrate in water.

2. The process as defined in claim 1, said steps (i) and (ii) comprising continuously supplying a feed consisting essentially of acetone azine dissolved in water to an hydrolysis/distillation reaction zone in a water/acetone azine molar ratio ranging from 3 to 7.

3. The process as defined by claim 2, said hydrolysis/distillation reaction zone comprising a fractionating column.

4. The process as defined by claim 1, said concentrated aqueous solution of acetone azine corresponding to the azeotropic composition thereof.

5. The process as defined by claim 3, said hydrolysis/distillation reaction zone comprising a single, plate or packed fractionating column.

6. The process as defined by claim 5, said fractionating column having constant diameter and number of theoretical plates per unit height thereof.

7. The process as defined by claim 3, comprising supplying said concentrated aqueous solution of acetone azine to the middle section of said fractionating column.

8. The process as defined by claim 3, comprising distilling (ii) at a reflux ratio ranging from 0.25 to 5.

9. The process as defined by claim 3, comprising distilling (ii) at a reflux ratio ranging from 0.5 to 2.

10. The process as defined by claim 1, said steps (i) and (ii) being carried out under a pressure ranging from 2 to 20 bars.

11. The process as defined by claim 1, said steps (i) and (ii) being carried out under a pressure ranging from 8 to 12 bars.

12. The process as defined by claim 3, said steps (i) and (ii) being carried out under a pressure ranging from 2 to 20 bars, and the temperature at the base of said fractionating column ranging from 150° C. to 200° C.

13. The process as defined by claim 3, said steps (i) and (ii) being carried out under a pressure ranging from 2 to 20 bars, and the temperature at the base of said fractionating column ranging from 175° C. to 200° C.

14. The process as defined by claim 1, comprising (iii) continuously withdrawing from said aqueous hydrolysis medium a base fraction consisting essentially of a stable, at least 45% concentrated solution of essentially pure hydrazine hydrate in water.

* * * * *